United States Patent
May et al.

(10) Patent No.: US 8,126,006 B2
(45) Date of Patent: Feb. 28, 2012

(54) METHOD OF PROVIDING A MEDIUM ACCESS PROTOCOL

(75) Inventors: Klaus Peter May, Aachen (DE); Guido Hiertz, Köln (DE); Jörg Habetha, Aachen (DE); Olaf Wischhusen, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 1470 days.

(21) Appl. No.: 10/570,868

(22) PCT Filed: Aug. 24, 2004

(86) PCT No.: PCT/IB2004/051551
§ 371 (c)(1),
(2), (4) Date: Mar. 7, 2006

(87) PCT Pub. No.: WO2005/025148
PCT Pub. Date: Mar. 17, 2005

(65) Prior Publication Data
US 2007/0025379 A1    Feb. 1, 2007

(30) Foreign Application Priority Data
Sep. 8, 2003   (EP) .................................... 03102721

(51) Int. Cl.
*H04L 12/413* (2006.01)
(52) U.S. Cl. ..... 370/445; 370/447; 370/449; 370/230.1; 370/450; 370/451; 370/452; 370/454; 370/412; 370/400; 370/401; 709/238; 709/245; 709/246

(58) Field of Classification Search .............. 370/338, 370/468, 447, 445, 449, 230.1, 450, 231, 370/451, 452, 454, 412, 400, 401; 709/238, 709/245, 246
See application file for complete search history.

(56) References Cited

U.S. PATENT DOCUMENTS

| | | | | |
|---|---|---|---|---|
| 5,963,560 A | * | 10/1999 | Kalkunte ...................... | 370/448 |
| 2002/0012359 A1 | * | 1/2002 | Kikuchi et al. ............... | 370/468 |
| 2004/0085964 A1 | * | 5/2004 | Vaananen .................... | 370/395.4 |
| 2004/0114546 A1 | * | 6/2004 | Seshadri et al. ............ | 370/310.2 |
| 2004/0121786 A1 | * | 6/2004 | Radcliffe et al. ............. | 455/500 |
| 2005/0099942 A1 | * | 5/2005 | Kurihara ...................... | 370/229 |

FOREIGN PATENT DOCUMENTS

| | | |
|---|---|---|
| JP | 20011231078 | 8/2001 |
| WO | W00241590 | 5/2002 |
| WO | W003028315 | 4/2003 |

\* cited by examiner

*Primary Examiner* — Patrick Edouard
*Assistant Examiner* — Fred Casca
(74) *Attorney, Agent, or Firm* — Larry Liberchuk

(57) ABSTRACT

A method of providing a medium access control protocol using a listen before-talk scheme within a wireless network having a plurality of stations communicating over a channel, wherein a valid route from a source station to a destination station via at least one more station is determined, said method comprising: transmitting a data packet over said channel by a first station; receiving said data packet in a second station; analyzing data in said data packet by said second station whether said data packet is to be forwarded further; and if said data packet is to be forwarded further, prioritizing transmission of said data packet on said valid route.

15 Claims, 1 Drawing Sheet

METHOD OF PROVIDING A MEDIUM ACCESS PROTOCOL

Figure 1:
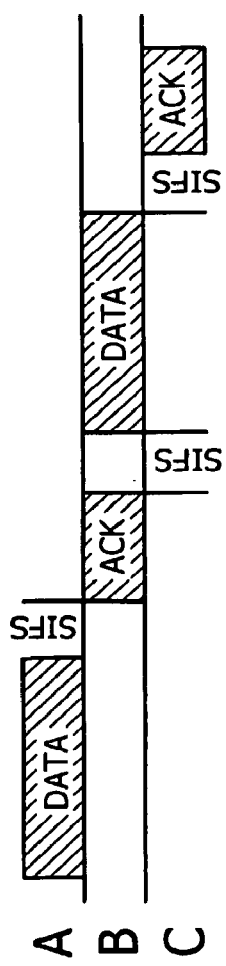

The invention relates to a method of providing a medium access control protocol using a listen-before-talk scheme within a wireless network having a plurality of stations communicating over a channel, wherein a valid route from a source station to a destination station via at least one more station is determined.

In recent years, there has been an increasing trend towards personal computers, workstations and other communication devices becoming portable and mobile, and consequently there is a growing interest in wireless packet networks.

To increase the range and capacity of a wireless network, the traffic is carried over multiple hops. Instead of sending the data packets directly from the source station to the destination station which might be unreachable for the given amount of transmission power, the data packets are sent from the source station to a forwarding station which copies them and sends them either to the destination station or to another forwarder.

The IEEE 802.11 standard for wireless local area networks covers in particular ad hoc networks lacking any fixed infrastructure. An IEEE 802.11 network, in general, consists of Basic Service Sets (BSS) consisting of mobile nodes, herein referred to as stations, controlled by a single coordination function that determines when a station transmits and receives via the wireless medium. Those BSSs are either in infrastructure mode or they work independently. In the first case, all stations of the BSS must be in the reception range of a Hybrid Coordinator (HC) or Point Coordinator (PC). In the latter case, all stations must be in the reception range of every other member of the BSS. Otherwise, no communication is possible.

The Medium Access Control (MAC) protocol that is common to all types of IEEE 802.11 radio networks is the Distributed Coordination Function (DCF) that works as a listen-before-talk scheme based on the Carrier Sense Multiple Access (CSMA) strategy with Collision Avoidance (CA). When a data packet is ready for sending, the MAC first senses the channel, and if the channel is idle, the MAC will send the data packet immediately. Otherwise, the system waits until the current transmission has finished to set a timer with a randomly chosen backoff time. When the timer expires, the MAC will send the data packet. During the backoff period, the timer is halted when the MAC layer detects activity on the channel again. Backoff minimizes collisions during contention between multiple stations, but then it causes an unpredictible delay. It also incorporates the risk of collisions which then decreases the throughput even more.

The MAC protocol defines a concept called virtual carrier sensing. Data frames and the optionally transmitted Request-To-Send/Clear-To-Send control frames (RTS/CTS) include the information of how long it takes to transmit the data packet including its corresponding Acknowledgement (ACK) response, and in case of fragmentation, including the next fragment. The RTS/CTS mechanism helps to protect data packets against hidden stations.

Immediate positive acknowledgements are employed to determine the successful reception of each data packet. This is accomplished by the receiving station initiating the transmission of an acknowledgement frame after a time interval Short Interframe Space (SIFS). SIFS are used for the highest priority to transmissions enabling stations with this type of information to access the radio link first. Examples of information which will be transmitted after the SIFS has expired include RTS and CTS messages in addition to positive acknowledgements.

To introduce multihop communication into IEEE 802.11, some efficiency problems need to be solved.

It is the object of the invention to provide a medium access control protocol which avoids frequent backoffs in multihop connections. Since IEEE 802.11 is already a widespread standard, the new protocol has to be compatible to the protocol existing devices rely on, since, even though those legacy devices will not be able to make use of the invention, it is desirable that they can still operate properly together with devices that support the improved multihop protocol.

This object is solved by a method of claim 1 and a network of claim 10.

According to the invention, the method comprises transmitting a data packet over said channel by a first station, receiving that data packet in a second station, analyzing data in said data packet by said second station whether said data packet is to be forwarded further, and if said data packet is to be forwarded further, prioritizing transmission of said data packet on the valid route from source station to destination station. In other words, the invention prioritizes the multihop route. Instead of performing a backoff after having received the data packet to be forwarded further, it is suggested to allow the receiving station to retransmit the data to the next hop practically immediately. Each forwarding station analyzes the incoming data and is therefore able to differentiate data to be relayed from data to be processed locally. It can therefore decide whether to transmit only the acknowledgement frame to the sender or to also forward the data packet to the next hop, preferably after only having waited a shorter waiting time interval than other stations with the same or any traffic class, which can be the shortest waiting time available in the system and is normally given by restrictions due to the listen-before-talk scheme. Said shorter waiting time interval may also be the interframe interval that corresponds to a higher priority class than the original priority of the packet. Also according to the invention, a wireless network having a plurality of stations communicating over a channel, wherein a valid route from a source station to a destination station via at least one more station is determined, controls communication using the above medium access control protocol.

It may also be that the acknowledgement is sent before the data packet is forwarded to the next station. An alternative is that said second station does not send an acknowledgement of receipt to said first station before forwarding the packet, as the forwarded packet is interpreted by said first station as acknowledgement of receipt of the packet.

Operating under the IEEE 802.11 standard and based on CSMA/CA, the shortest waiting time will be the Short Interframe Space SIFS. In the sub-standard IEEE 802.11e the Distributed Inter-Frame Space (DIFS), which is the normal waiting time in-between transmissions, has been replaced by the concept of the "Arbitrary Inter-Frame Spaces" (AIFS). There are different AIFS (waiting time) lengths depending on the priority, rsp. traffic category of the packet to be transmitted. As an alternative to employ SIFS instead of DIFS for multihop connections, it is therefore also possible with 802.11e to employ a shorter AIFS for multihop connections than for all other single hop connections of the same traffic class. Even though the SIFS instead of DIFS solution is more efficient for multihop connections because it is almost impossible for other connections to interrupt the end-to-end transmission of a multihop packet, the short AIFS solution provides at least a basic prioritization of the multihop traffic.

Figure 2:
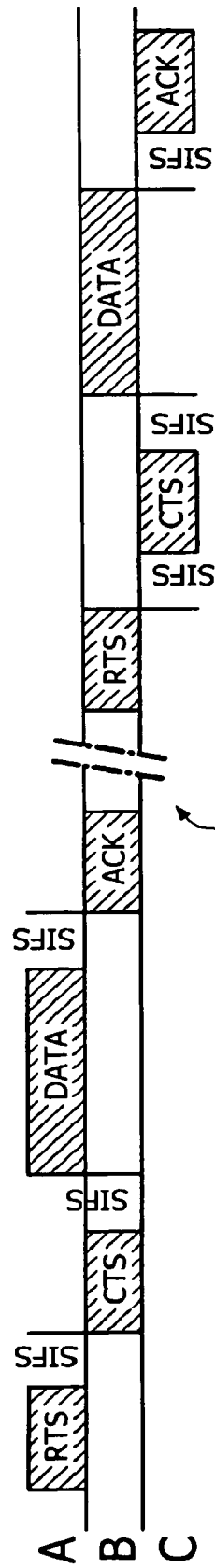

The invention will be further described in detail below with reference of the accompanying drawings, wherein FIG. 1 illustrates a procedure according to the invention; and FIG. 2 illustrates the standard procedure for multihop in IEEE 802.11.

FIG. 1 shows station B which is forwarding data received from station A to station C. After having transmitted the ACK frame to station A and having still waited the SIFS period in between the acknowledgement of the received data packet and its forwarding, the relaying station has highest priority. Stations A and C can be completely standard conform, only the forwarding stations need to be modified.

Other stations will not be able to access the medium in the meantime since they will detect a busy medium when station B starts its transmission. This is independent from whether they are able to support the new method themselves.

According to the standard procedure in IEEE 802.11, on the other hand, as shown in FIG. 2, a forwarding station B sends the data it receives from station A to a third station C which can be the destination station or another forwarding station. The transmission consists of two independent sessions, from station A to station B, then from station B to station C. They are fully conforming to IEEE 802.11 as fully separated by the backoff time in which the channel can be accessed by another node.

The invention avoids the backoff mechanism and therefore increases the throughput considerably. The receiving station of a hop can forward the data packet it has just received directly after the shortest wait time defined in IEEE 802.11, the Short Interframe Space, meaning with highest priority.

The invention can be used in car-to-car communication, in in-house communication and at access points with meshed networks.

The invention claimed is:

1. A method of providing a medium access control protocol using a listen-before-talk scheme within a wireless network having a plurality of stations communicating over a channel, wherein a valid route from a source station to a destination station via at least one more station is determined, said method comprising:
   transmitting a data packet over said channel by a first station;
   receiving said data packet in a second station;
   analyzing data in said data packet by said second station whether said data packet is to be forwarded further; and
   when said data packet is to be forwarded further, prioritizing transmission of said data packet on said valid route over transmissions by other stations with the same or any traffic class, wherein the transmissions by other stations are not via the second station.

2. The method as claimed in claim 1, wherein the prioritizing transmission of said data packet on said valid route over transmissions by other stations with the same or any traffic class comprises forwarding said data packet from said second station to a third station after a shorter waiting time interval than the other stations with the same or any traffic class.

3. The method as claimed in claim 2, wherein said shorter waiting time interval is the shortest waiting time possible in the system.

4. The method as claimed in claim 2, wherein said shorter waiting time interval is the inter-frame interval that corresponds to a higher priority class than the original priority of the packet.

5. The method as claimed in claim 2, wherein said second station acknowledges receipt of said data packet before forwarding it to said third station.

6. The method as claimed in claim 2, wherein said second station does not send an acknowledgement of receipt to said first station before forwarding the packet, as the forwarded packet is interpreted by said first station as acknowledgement of receipt of the packet.

7. Use of a method as defined in claim 1 in car-to-car communication.

8. Use of a method as defined in claim 1 in in-house communication.

9. Use of a method as defined in claim 1 at access points with meshed networks.

10. A wireless network having a plurality of stations communicating over a channel, wherein a valid route from a source station to a destination station via at least one more station is determined, the communication between stations being controlled by a medium access control protocol using a listen-before-talk scheme to
   transmit a data packet over said channel by a first station;
   receive said data packet in a second station;
   analyze data in said data packet by said second station whether said data packet is to be forwarded further; and
   when said data packet is to be forwarded further, prioritize transmission of said data packet on said valid route over transmissions by other stations with the same or any traffic class, wherein the transmissions by other stations are not via the second station.

11. The network as claimed in claim 10, wherein the prioritized transmission of said data packet on said valid route over transmissions by other stations with the same or any traffic class comprises forwarding said data packet from said second station to a third station after a shorter waiting time interval than the other stations with the same or any traffic class.

12. The network as claimed in claim 11, wherein said shorter waiting time interval is the shortest waiting time possible in the system.

13. The network as claimed in claim 11, wherein said shorter waiting time interval is the inter-frame interval that corresponds to a higher priority class than the original priority of the packet.

14. The network as claimed in claim 11, wherein said second station acknowledges receipt of said data packet before forwarding it to said third station.

15. The network as claimed in claim 11, wherein said second station does not send an acknowledgement of receipt to said first station before forwarding the packet, as the forwarded packet is interpreted by said first station as acknowledgement of receipt of the packet.

* * * * *